United States Patent
Deibler et al.

(10) Patent No.: US 11,734,360 B2
(45) Date of Patent: *Aug. 22, 2023

(54) METHODS AND SYSTEMS FOR FACILITATING CLASSIFICATION OF DOCUMENTS

(71) Applicant: Catachi Co., San Francisco, CA (US)

(72) Inventors: Danielle Lee Deibler, San Francisco, CA (US); Brendan Callahan, San Francisco, CA (US); Christopher Walker, San Francisco, CA (US)

(73) Assignee: Catachi Co., San Francisco, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 17/127,032

(22) Filed: Dec. 18, 2020

(65) Prior Publication Data
US 2021/0191981 A1 Jun. 24, 2021

Related U.S. Application Data

(60) Provisional application No. 62/949,614, filed on Dec. 18, 2019.

(51) Int. Cl.
*G06F 16/00* (2019.01)
*G06F 16/906* (2019.01)
(Continued)

(52) U.S. Cl.
CPC ...... *G06F 16/906* (2019.01); *G06F 16/24575* (2019.01); *G06F 16/345* (2019.01);
(Continued)

(58) Field of Classification Search
CPC .. G06F 16/358; G06F 16/986; G06F 16/9535; G06F 16/24575; G06F 16/345; G06F 16/908; G06Q 10/10; G06Q 10/107
See application file for complete search history.

(56) References Cited

U.S. PATENT DOCUMENTS 7,899,871 B1 * 3/2011 Kumar ............... G06Q 10/107
  709/206
8,793,249 B2 * 7/2014 Lai ..................... G06F 16/9535
  706/20

(Continued)

FOREIGN PATENT DOCUMENTS

WO  WO2010144618 A1 * 12/2010
WO  WO2012116241 A2 *  8/2012
WO  WO2017222836 A1 * 12/2017

OTHER PUBLICATIONS

A. Moschitti et al., "Answer filtering via text categorization in question answering systems", Proceedings. 15th IEEE International Conference on Tools with Artificial Intelligence, Nov. 2003, pp.*

*Primary Examiner* — Srirama Channavajjala

(57) ABSTRACT

Disclosed herein is a method for facilitating the classification of documents. Accordingly, the method may include receiving, using a communication device, documents from at least one user device, analyzing, using a processing device, the documents based on a filter, classifying, using the processing device, the documents into a topic based on the analyzing of the documents, transmitting, using the communication device, the documents and a topic identifier associated with the topic to a user device, receiving, using the communication device, a judgment data from the user device, analyzing, using the processing device, the judgment data, modifying, using the processing device, the filter based on the analyzing of the judgment data, generating, using the processing device, a modified filter based on the modifying, and storing, using a storage device, the modified filter.

18 Claims, 12 Drawing Sheets

(51) Int. Cl.
    *G06F 16/93*       (2019.01)
    *G06N 20/00*       (2019.01)
    *G06F 18/21*       (2023.01)
    *G06F 16/958*      (2019.01)
    *G06F 16/34*       (2019.01)
    *G06F 16/9535*     (2019.01)
    *G06F 16/35*       (2019.01)
    *G06F 16/2457*     (2019.01)
    *G06F 16/908*      (2019.01)

(52) U.S. Cl.
    CPC .......... *G06F 16/358* (2019.01); *G06F 16/908* (2019.01); *G06F 16/93* (2019.01); *G06F 16/9535* (2019.01); *G06F 16/986* (2019.01); *G06F 18/2178* (2023.01); *G06N 20/00* (2019.01)

(56) References Cited

U.S. PATENT DOCUMENTS

| | | | | |
|---|---|---|---|---|
| 2002/0080196 A1* | 6/2002 | Bornstein | ............. | G06F 16/345 |
| | | | | 715/854 |
| 2014/0237540 A1* | 8/2014 | King | ................... | G06F 16/908 |
| | | | | 726/1 |
| 2016/0147891 A1* | 5/2016 | Chhichhia | ............. | G06F 16/986 |
| | | | | 707/734 |
| 2016/0239575 A1* | 8/2016 | Pradhan | ............ | G06F 16/24575 |
| 2016/0371259 A1* | 12/2016 | Kohlmeier | ............. | G06Q 10/10 |
| 2017/0228369 A1* | 8/2017 | Zelenkov | ............... | G06F 16/345 |
| 2020/0175052 A1* | 6/2020 | Wang | ................... | G06F 16/358 |

* cited by examiner

METHODS AND SYSTEMS FOR FACILITATING CLASSIFICATION OF DOCUMENTS

The current application claims a priority to the U.S. Provisional Patent application Ser. No. 62/949,614 filed on Dec. 18, 2019.

FIELD OF THE INVENTION

Generally, the present disclosure relates to the field of data processing. More specifically, the present disclosure relates to methods and systems for facilitating classification of documents.

BACKGROUND OF THE INVENTION

Generally, documentation may be described as a written and retained record of events. Documentation may include elements that may be required to be included, such as policies, practice, and rules. Further, documentation may be a written record of actions, discussion, incidents, disciplinary action, positive contributions, reward and recognition, investigations, failure to accomplish requirements and goals, and performance evaluations kept by authorities.

Accordingly, the classification of documents is of utmost importance. Classification may help individuals, and organizations to retrieve specific information in a set timeframe. The information may be particular to a specific time and may pertain to one, or multiple topics or individuals. As such, id documents are classified with respect to categories, topics, headings, periods, and so on, the retrieval, and display of the documents becomes exponentially easier to accomplish. Further, current technologies to classify documents employ machine learning techniques. However, current technologies to classify documents do not include a hierarchical system of multiple experts to classify documents and supervise and improve the machine learning procedure and algorithms to classify documents. Further, current technologies to classify documents do not send documents for classification to experts based on the difficulty and complexity of the document. Further, current technologies do not receive user feedback on the relevance of results of classification of the documents after classification may have been performed. Furthermore, current technologies to classify documents do not pre-classify the documents before sending the documents to experts for further classification.

Therefore, there is a need for improved methods and systems for facilitating the classification of documents that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating classification of documents, in accordance with some embodiments. Accordingly, the method may include a step of receiving, using a communication device, a plurality of documents from at least one user device. Further, the method may include a step of analyzing, using a processing device, the plurality of documents based on at least one filter. Further, the method may include a step of classifying, using the processing device, the plurality of documents into at least one topic based on the analyzing of the plurality of documents. Further, the method may include a step of transmitting, using the communication device, the plurality of documents and at least one topic identifier associated with the at least one topic to the at least one user device. Further, the method may include a step of receiving, using the communication device, at least one judgment data from the at least one user device. Further, the at least one judgment data may include a judgment on at least one relationship of the plurality of documents with the at least one topic. Further, the method may include a step of analyzing, using the processing device, the at least one judgment data. Further, the method may include a step of modifying, using the processing device, the at least one filter based on the analyzing of the at least one judgment data. Further, the method may include a step of generating, using the processing device, at least one modified filter based on the modifying. Further, the at least one modified filter may be used for classifying the plurality of documents into the at least one topic. Further, the method may include a step of storing, using a storage device, the at least one modified filter.

Further disclosed herein is a system for facilitating classification of documents, in accordance with some embodiments. Accordingly, the system may include a communication device configured for receiving a plurality of documents from at least one user device. Further, the communication device may be configured for transmitting the plurality of documents and at least one topic identifier associated with at least one topic to the at least one user device. Further, the communication device may be configured for receiving at least one judgment data from the at least one user device. Further, the at least one judgment data may include a judgment on at least one relationship of the plurality of documents with the at least one topic. Further, the system may include a processing device communicatively coupled with the communication device. Further, the processing device may be configured for analyzing the plurality of documents based on at least one filter. Further, the processing device may be configured for classifying the plurality of documents into the at least one topic based on the analyzing of the plurality of documents. Further, the processing device may be configured for analyzing the at least one judgment data. Further, the processing device may be configured for modifying the at least one filter based on the analyzing of the at least one judgment data. Further, the processing device may be configured for generating at least one modified filter based on the modifying. Further, the at least one modified filter may be used for classifying the plurality of documents into the at least one topic. Further, the system may include a storage device communicatively coupled with the processing device. Further, the storage device may be configured for storing the at least one modified filter.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
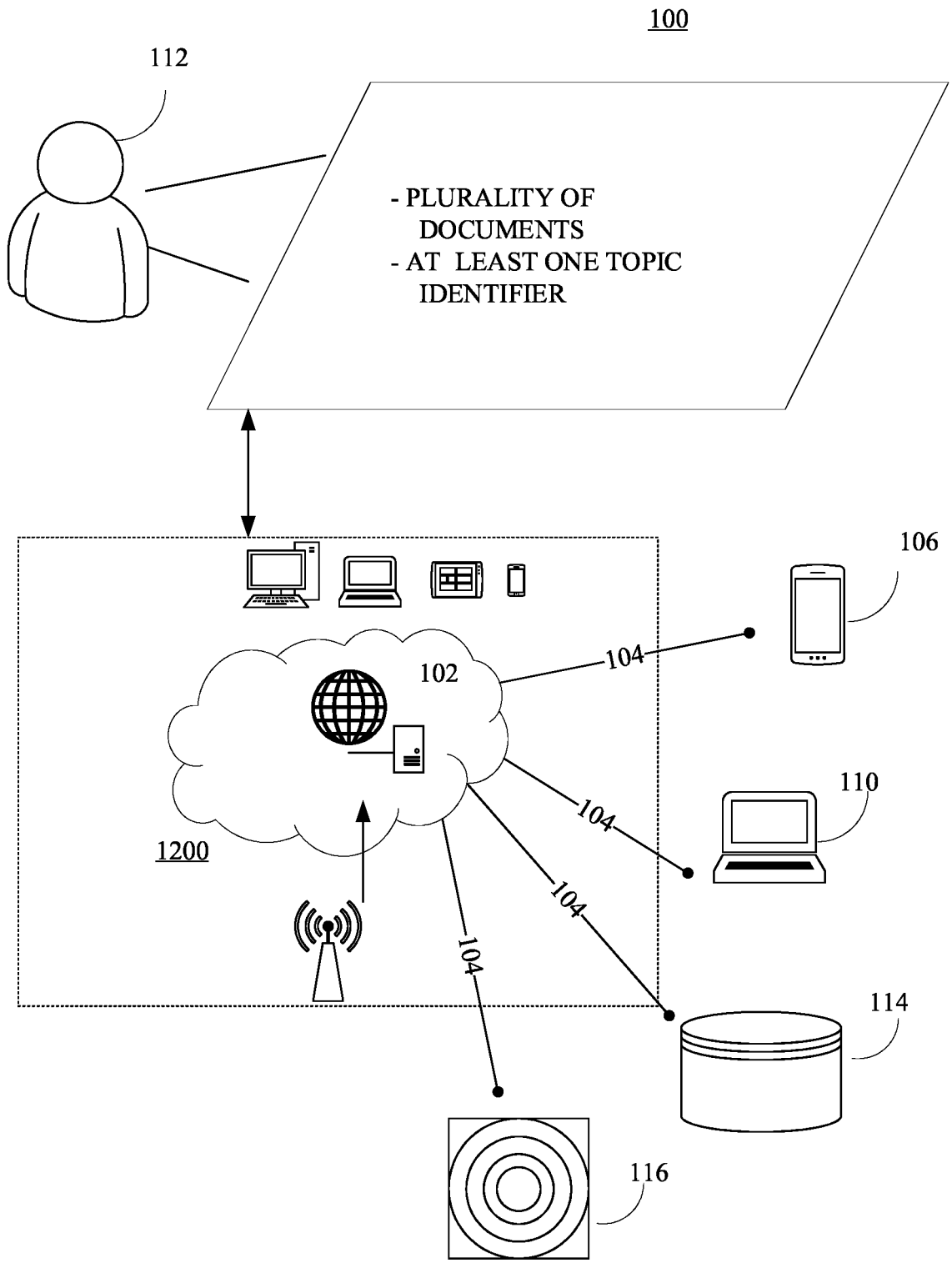
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems for facilitating classification of documents, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods and systems for facilitating classification of documents. Further, the documents may include regulatory documents. Further, the disclosed system may facilitate performing automatic classification of the regulatory documents. Regulatory documents may include but may not be limited to legal documents including regulations, and laws, medical documents including research papers, and case studies, and documents related to any other field of study or research. The regulatory documents may be retrieved and accessed from external connected databases. The databases may include legal databases, medical databases, engineering, and architectural databases, and so on.

Further, the classification of the regulatory documents may be performed automatically or with the help of human intervention.

Further, the disclosed system may include a user device that a user may use to access the system. The user device may be a mobile device such as, but not limited to, a smartphone, or a computer tablet, or a computing device like a personal computer, or a laptop. The user device may include a communication device configured to communicate over a communication network such as, but not limited to, a cellular network, a satellite network, a personal area network, Bluetooth, Internet, and so on. Further, the user device may include sensors.

Further, the disclosed system may allow users to register and create user profiles. Further, the user profiles may include information about the name, age, gender, location, and so on about the users. Further, the user profiles may include information about the profession of the users, such as a lawyer, doctor, and so on. Further, the profession of the users may be specified to include the specialization, for instance, a lawyer may specialize in mergers and acquisitions, and a doctor may specialize in neurology.

The automatic classification of regulatory documents may be facilitated and performed by an advanced machine-learning algorithm. The regulatory documents may be retrieved from externally connected databases that may store the regulatory documents. Externally connected databases may include, but may not be limited to medical databases, legal databases, engineering databases, and so on. Accordingly, the regulatory documents may be analyzed based on included keywords, mentioned topics, headings, and so on. The regulatory documents may be analyzed and classified by assigned to particular topics and categories that may contain similar regulatory documents.

Further, the process of classification of regulatory documents may be improved with the help of human expert judgment. Human expert judgment may be obtained from users of an online platform, who may be expert and proficient in specific fields and areas of study. An initial classification of regulatory documents may be performed. Further, the classified regulatory documents may be sent to human experts who may judge the initial classification. The human experts may analyze the classified regulatory documents, and analyze the regulatory documents by reading, and analyzing based on topics, special keywords, context, and so on. Further, human experts may assign regulatory documents that may have been wrongly classified to the correct topic and category.

Further, the disclosed system may use a combination of unsupervised machine learning that may be improved with the help of human expert intervention, may be used to classify regulatory documents.

Further, the disclosed system may facilitate automatic classification of regulatory documents may be performed with the help of unsupervised machine learning. Further, the process of machine learning may be supervised and supplemented with statistical judgment prioritization by human experts. Statistical judgment may include a hierarchy of human experts. The hierarchy of judges may include multiple judges, who may be human experts at various different levels. Further, the lowest level of the hierarchy may include the maximum level of human experts. The human experts may be proficient in limited areas of study, and the knowledge of the human experts in the lowest level of the hierarchy may be limited. For instance, human experts may be college students. Accordingly, the human experts in the lowest level of the hierarchy may be provided with the same regulatory documents to analyze, sort, and classify. The human experts may proceed to read the regulatory documents and provide judgment about the regulatory documents to sort and classify the regulatory documents. The human expert may provide binary judgment, detailing whether or not a document may belong to a particular topic or category. Additionally, the human expert may provide expanded judgment, choosing the sentence, words, or phrase that may best describe and bind a regulatory document to a particular topic or category. Further, if a pre-defined number of human experts provide the same judgment for a particular regulatory document, the judgment may be accepted and used in the improvement of machine learning algorithms to analyze and categorize the regulatory documents. Alternatively, if a similar judgment is not provided for a particular regulatory document, the regulatory document may be transferred to a higher hierarchical level of human experts for judgment. The number of human experts in the higher hierarchical level of judgment may be lower than the lower level. Further, the expertise and proficiency of the human experts in the higher hierarchical level of judgment may be more than the human experts in the lower hierarchical level of judgment. Further, the process of analysis and categorization of regulatory documents may be repeated until a predetermined number of human experts do not provide the same judgment, classifying and categorizing a regulatory document to a particular topic or category. Further, the user who may search for classified regulatory documents may analyze the regulatory documents and provide feedback and judgment on the displayed regulatory documents. The user judgment may be analyzed and used to improve the process of classification of regulatory documents. Further, a first user interface associated with the disclosed system to facilitate the automatic classification of regulatory documents is disclosed. The first user interface shows a judgment interface, that a human expert may view and use to judge and classify the regulatory documents. The first user interface may show the number of regulatory documents in the queue. The regulatory documents may have been automatically classified to belong to a certain topic and category. Further, the first user interface may show a current document, and details about the current document. The details may include the author, publication date, document id, document type, and web URL of the regulatory document.

Further, the first user interface may show the details of the topic and the category that the regulatory document may have been automatically been classified to. Accordingly, the human expert may have to provide binary judgment specifying whether the regulatory document may belong to the particular category. Further, the first user interface may also contain a field to insert arbitrary tags. The human expert may choose to add any additional tags that may help in the classification of the regulatory document. The human expert may choose to assign the regulatory document to any other topic through the additional tags.

Further, the first user interface may include a field to indicate the difficulty of judgment. Accordingly, if a human expert finds a regulatory document hard to judge, the human expert may choose to skip the judgment on the regulatory document after describing the difficulty. The difficulty of judgment may be gauged and if a regulatory document of a particular type is found to be complex or difficult for human experts of a particular hierarchical level, the regulatory document, along with regulatory documents of similar type and complexity may be assigned to human experts belonging to a higher hierarchical level of judgment. Further, the difficulty of entire queues of regulatory documents may be gauged and queues of a particular level of difficulty may be sent to the particular hierarchical level of human experts. Further, a second user interface of the system to facilitate the automatic classification of regulatory documents is disclosed. The second user interface may allow the user to search for regulatory documents. Further, the user, who may use the system and search for particular regulatory documents, may access the second user interface. The user may search for regulatory documents that may belong to any topic, category, and subject. Further, the user may specify the document type of the regulatory documents may be of any type, such as news articles, enforcement, or rule changes. Further, the user may specify the date of publication and updating of the regulatory documents. The date and period may be specified to be a particular day, week, month, or year. Further, the user may specify the source regulatory documents and may specify whether the user may have read, or not read the regulatory document before.

Further, the user may be shown multiple regulatory documents as result. For instance, the regulatory documents may be displayed based on the time when the regulatory documents may have been published or updated, such as by month that the regulatory documents may have been published or updated in. Further, in other embodiments, the regulatory documents may be displayed based on the type of document based on the source. For instance, the regulatory documents displayed may be mainstream news or agency news. Further, the user may choose to view all regulatory documents that may be news at once. Accordingly, the user may select the appropriate option from the second user interface. Further, a third user interface associated with the disclosed system to facilitate the automatic classification of regulatory documents is disclosed. Further, the user may search for regulatory documents and may provide judgment and feedback on the regulatory documents that may be displayed as results. The user may search for a particular topic, or category of regulatory documents. Accordingly, multiple regulatory documents satisfying the search criteria set by the user may be displayed. The user may analyze the regulatory documents and provide feedback and judgment on the displayed regulatory documents. The user may provide feedback and judgment in a binary manner. The regulatory documents may be accompanied with yes and no options. Accordingly, the user may provide yes or no responses for each regulatory document and specify whether the regulatory documents displayed as results may belong to the topic and category that the user may have searched.

Further, using a combination of summarization techniques, the disclosed system may be configured for summarizing documents related to regulation. Further, extractive summarization associated with the disclosed system may include the collection and application of sentence-ranking data regarding regulatory compliance documents.

Further, using a narrowly-tailored word- and sentence-segmentation process associated with the disclosed system, the disclosed system may provide text summaries that are "compressions" of the original text—achieved via sentence extraction. Further, the novel text summaries may be assembled from contents of the document(s) being summarized by scoring the value of each sentence for its use in a text summary of the document, as validated by the feedback of expert judges and other ground-truth metrics. A weighted-feature approach to sentence scoring lays the foundation for a number of learned and hand-tuned strategies that can be effectively tuned to accommodate different topics, genres, rates of compression, or other corpus heterogeneity. Further, the disclosed system may follow best practices and instrumentation for the capture of sentence ranking preferences from domain experts. Further, the disclosed system may follow best practices and instrumentation for the evaluation of summary proposals. Further, the disclosed system may be configured for genre-specific sentence segmentation and classification. Further, the disclosed system may be configured for genre-specific word tokenization sensitive to domain names and citation patterns. Further, the disclosed system may be associated with genre-specific weighted-feature scoring algorithms for sentence ranking (and iterative re-ranking) to aid in sentence selection for summary construction. Further, abstractive summarization associated with the disclosed system may include a novel slot-driven document and multi-document summarizer producing textual summaries. Using scrapers, crawlers, and Natural Language Processing techniques, the disclosed system provides text summaries that represent the distillation of the content of regulatory documents into a newly-created passage of text reflecting the most important themes or topics in those documents. Further, the disclosed system may identify key concepts and references in the documents; then we establish the important links and similarities between the concepts, references, and documents. Further, the disclosed system may compress these concepts down to the most important facts and express those facts in the form of natural English sentences. Further, the disclosed system may be configured for identification, classification, and resolution of document citations in the text using a novel blend of learned, manual, and rule-based approaches. Further, the disclosed system may be configured for the extraction, classification, and resolution (or disambiguation) of a number of genre-specific attributes including names of people and organizations, amounts of money, legal actions and outcomes, dates, requirements, etc. Further, the disclosed system may be associated with algorithms and models for the construction of text passages using the information provided in genre-specific slots filled by the items extracted from the text(s) being summarized.

Further, the disclosed system may be configured for numeric summarization. Further, the disclosed system may be associated with a slot-driven document and multi-document summarizer producing tabular and chart summaries. Using scrapers, crawlers, and Natural Language Processing techniques, the disclosed system may provide numerical summaries that represent the distillation of the content of regulatory documents into a newly-created passage of text reflecting the most important themes or topics in those documents. Further, the disclosed system may be configured for identifying key concepts and references in the documents and then establishing the important links and similarities between the concepts, references, and documents; then compressing these concepts down to the most important facts and express those facts in the form of tables and charts of statistical summaries. Further, the disclosed system may be configured for the identification, classification, and resolution of document citations in the text using a novel blend of learned, manual, and rule-based approaches. Further, the disclosed system may be configured for the extraction, classification, and resolution (or disambiguation) of a number of genre-specific attributes including names of people and organizations, amounts of money, legal actions and outcomes, dates, requirements, etc. Further, the disclosed system may be associated with algorithms and models for the construction of tables and charts using the information provided in genre-specific slots filled by the items extracted from the text(s) being summarized.

Further, filtering recent documents by topic is an important aspect of regulatory change management. Further, the disclosed system may be configured for the surfacing and automatic classification of regulatory documents. Further, the disclosed system may be configured for generating topic classification (or filters) of documents (e.g. regulatory documents) based on a blend of expert task specification, assessment, human-driven real-time classification, statistical judgment prioritization, and machine learning techniques.

Further, the disclosed system may apply filter attributes to both recent additions and historically-published documents found in our system. These filters are then made available to regulatory compliance workers using a proprietary web UI which also allows them to provide their expert feedback. Further, the disclosed system may be configured for the creation and validation of repeatable, consistent guidelines for human judgment tasks about classification problems, especially "topic" classification, but also other kinds of relevance. Further, the disclosed system may be configured for the rapid creation of training data in support of machine learning for document classification. Further, the disclosed system may include a specialized judgment interface configurable for a wide variety of human judgment tasks relevant to the semantics of regulatory documents in the financial domain. Further, the disclosed system may include a specialized queueing and sampling infrastructure designed to optimize both the performance of the learned models and the efficiency of the human judges. Further, the disclosed system may emphasize client-facing accuracy over learned-model accuracy. Further, the disclosed system may be associated with a flexible framework capable of supporting arbitrary document classification tasks.

Further, the disclosed system may be configured for generating navigable citation-based graph UI for regulatory documents. Using scrapers, crawlers, and Natural Language Processing techniques, the disclosed system may be configured for identifying links between regulatory documents and provide a novel visualization for inspecting the impact and similarity of all the documents linked to a given one. Further, the disclosed system may be configured for the identification, classification, and resolution of document citations in the text using a novel blend of learned, manual, and programmed approaches. Further, the disclosed system may be configured for the retrieval and display of citation-connected regulatory documents collected from various state and federal agencies. Further, the disclosed system may be configured for generating circles and line graph visualization of document co-citation that encodes document attributes such as genre, jurisdiction, and impact using visual cues such as shape, size, and color. Further, the disclosed system may be configured for the presentation of topic filters in a GUI for filtering documents (e.g. regulatory documents) and receiving feedback from users of the GUI in order to improve the topic classification. Further, the disclosed system may be configured for providing a specialized judgment interface configurable for a wide variety of human judgment tasks relevant to the semantics of regulatory documents in the financial domain. The disclosed system may be associated with a specialized queuing and sampling infrastructure designed to optimize both the performance of the learned models and the efficiency of the human judges.

Further, the disclosed system may use a connected-graph based technique for automatic topic classification and discovery. Using scrapers, crawlers, and Natural Language Processing techniques, the disclosed system may be configured for identifying clusters of closely related documents and provide a novel interface for their inspection, navigation, and aggregation. Further, the disclosed system may be configured for identification, classification, and resolution of document citations in the text using a novel blend of learned, manual, and rule-based approaches. Further, the disclosed system may be configured for unique citation-based document representation. Further, the disclosed system may use unsupervised clustering techniques based on our unique graph-based document representation. Further, the disclosed system may be associated with a user interface for the ranked presentation of the most similar documents for each document (that has either incoming or outgoing citations).

Further, the disclosed system may use a combination of summarization techniques we have developed a proprietary model for summarizing documents related to regulation. Further, the disclosed system may be configured for generating a text summary of a document (e.g. regulatory document) based on scoring the value of each sentence for its use in a text summary of the document, as validated by the feedback of expert judges and other ground-truth metrics. Further, the disclosed system may be configured for assigning weights to sentences for summarization based on topics, genres, rates of compression, or other corpus heterogeneity. Further, the disclosed system may be configured for generating summaries of multiple documents (e.g. regulatory documents) based on important links and similarities between the concepts, references, and documents; and compressing these concepts down to the most important facts; and expressing those facts in the form of natural English sentences. Further, the disclosed system may be configured for generating summaries of multiple documents in the form of tables and charts based on citation analysis.

Variable-length summaries are constructed via an iterative 1-best sentence extraction process leveraging, among other features: depth in the document, depth in the section, topic-relevance, topic-diversity, discourse coherence, "slot" coverage (e.g. "respondent", "violation", "penalty" and "enforcement action type" for regulatory enforcement documents), summary "cue score" (i.e. the similarity of the sentence to summaries previously seen), and other proprietary document and sentence understanding-related features. The key distinguishing features of the disclosed system are: (1) the ability to vary the "compression rate" of the summarization engine to accommodate various summarization needs and (2) a suite of re-weighting strategies sensitive to this variability and optimized toward summaries that gracefully balance topic relevance, subtopic diversity and contextual coherence. Both word scoring and sentence selection weights are "learned" from text data using a variety of supervised and unsupervised methods familiar within ML.

Referring now to figures, FIG. 1 is an illustration of an online platform 100 consistent with various embodiments of the present disclosure. By way of non-limiting example, the online platform 100 to facilitate classification of documents may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1200.

Figure 2:
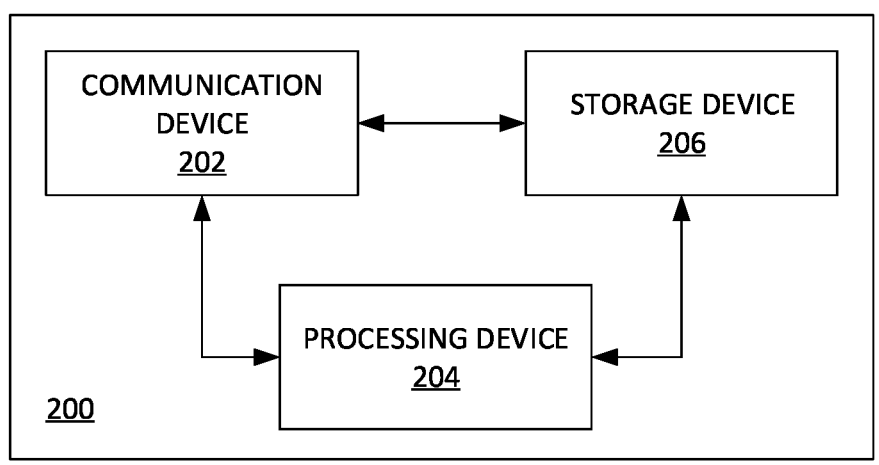
FIG. 2 is a block diagram of a system for facilitating classification of documents, in accordance with some embodiments.

FIG. 2 is a block diagram of a system 200 for facilitating classification of documents, in accordance with some embodiments. Accordingly, the system 200 may include a communication device 202 configured for receiving a plurality of documents from at least one user device. Further, the plurality of documents may include a plurality of regulatory documents. Further, the at least one user device may include a computing device such as, but not limited to, a smartphone, a tablet, a smartwatch, a laptop, a desktop, and so on. Further, the communication device 202 may be configured for transmitting the plurality of documents and at least one topic identifier associated with at least one topic to the at least one user device. Further, the communication device 202 may be configured for receiving at least one judgment data from the at least one user device. Further, the at least one judgment data may include a judgment on at least one relationship of the plurality of documents with the at least one topic. Further, the plurality of documents may include a plurality of regulatory documents.

Further, the system 200 may include a processing device 204 communicatively coupled with the communication device 202. Further, the processing device 204 may be configured for analyzing the plurality of documents based on at least one filter. Further, the processing device 204 may be configured for classifying the plurality of documents into the at least one topic based on the analyzing of the plurality of documents. Further, the processing device 204 may be configured for analyzing the at least one judgment data. Further, the processing device 204 may be configured for modifying the at least one filter based on the analyzing of the at least one judgment data. Further, the processing device 204 may be configured for generating at least one modified filter based on the modifying. Further, the at least one modified filter may be used for classifying the plurality of documents into the at least one topic. Further, the at least one topic may be at least one category of the plurality of documents.

Further, the system 200 may include a storage device 206 communicatively coupled with the processing device 204. Further, the storage device 206 may be configured for storing the at least one modified filter.

Further, in some embodiments, the at least one judgment data may include at least one user device identifier associated with the at least one user device. Further, the processing device 204 may be configured for identifying at least one user associated with the at least one user device based on the at least one user device identifier. Further, the processing device 204 may be configured for analyzing at least one user information. Further, the processing device 204 may be configured for authenticating the at least one user based on the analyzing of the at least one user information. Further, the storage device 206 may be configured for retrieving at least one user information associated with the at least one user based on the identifying. Further, the analyzing of the at least one judgment data may be based on the authenticating.

Further, in some embodiments, the processing device 204 may be configured for determining a proficiency of the at least one user in the at least one topic based on the analyzing of the at least one user information. Further, the processing device 204 may be configured for assigning a confidence level to the judgment based on the determining of the proficiency. Further, the analyzing of the at least one judgment data may include comparing the confidence level with a predetermined confidence level. Further, the modifying of the at least one filter may be based on the comparing.

Further, in some embodiments, the storage device 206 may be configured for retrieving a plurality of user identifiers associated with a plurality of users. Further, the plurality of users may be associated with a plurality of hierarchical levels of a proficiency in the at least one topic. Further, the processing device 204 may be configured for identifying a plurality of lower level user identifiers of the plurality of user identifiers associated with a plurality of lower level users of the plurality of users. Further, the plurality of lower level users may be associated with a lower hierarchical level of the plurality of hierarchical levels. Further, the at least one user device may include a plurality of lower level user devices. Further, the transmitting of the plurality of documents and the at least one topic identifier to the plurality of lower level user devices may be based on the identifying of the plurality of lower level user identifiers. Further, the at least one judgment data may include a plurality of lower level judgment data. Further, the receiving of the plurality of lower level judgment data from the plurality of lower level user devices may be based on the transmitting of the plurality of documents and the at least one topic identifier to the plurality of lower level user devices. Further, the processing device 204 may be configured for analyzing the plurality of lower level judgment data. Further, the plurality of lower level judgment data may include a plurality of judgments on the at least one relationship of the at least one document with the at least one topic. Further, the processing device 204 may be configured for determining a lower level consistency of the plurality of judgments based on the analyzing of the plurality of lower level judgment data. Further, the processing device 204 may be configured for comparing the lower level consistency with a predetermined range of the lower level consistency. Further, the modifying of the at least one filter may be based on the comparing of the lower level consistency.

Further, in some embodiments, the processing device 204 may be configured for identifying a plurality of higher level user identifiers of the plurality of user identifiers associated with a plurality of higher level users of the plurality of users based on the determining of the lower level consistency. Further, a number of the plurality of higher level users may be lower than a number of the plurality of lower level users. Further, the plurality of higher level users may be associated with a higher hierarchical level of the plurality of hierarchical levels. Further, the at least one user device may include a plurality of higher level user devices. Further, the transmitting of the plurality of documents and the at least one topic identifier to the plurality of higher level user devices may be based on the identifying of the plurality of higher level user identifiers. Further, the at least one judgment data may include a plurality of higher level judgment data. Further, the receiving of the plurality of higher level judgment data from the plurality of higher level user devices may be based on the transmitting of the plurality of documents and the at least one topic identifier to the plurality of higher level user devices. Further, the processing device 204 may be configured for analyzing the plurality of higher level judgment data. Further, the plurality of higher level judgment data may include a plurality of judgments on the at least one relationship of the at least one document with the at least one topic. Further, the processing device 204 may be configured for determining a higher level consistency of the plurality of judgments based on the analyzing of the plurality of higher level judgment data and the analyzing of the plurality of lower level judgment data. Further, the processing device 204 may be configured for comparing the higher level consistency with a predetermined range of the higher level consistency. Further, the modifying of the at least one filter may be based on the comparing of the higher level consistency.

Further, in some embodiments, the at least one filter may include at least one machine learning algorithm. Further, the analyzing of the plurality of documents may be based on the at least one machine learning algorithm.

Further, in some embodiments, the modifying of the at least one filter may include improving the at least one machine learning algorithm. Further, the generating of the at least one modified filter may include generating at least one improved machine learning algorithm based on the improving. Further, the at least one improved machine learning algorithm may be used for classifying the plurality of documents into the at least one topic.

Further, in some embodiments, the communication device 202 may be configured for receiving the at least one topic from the at least one user device. Further, the at least one topic may be associated with at least one domain. Further, the processing device 204 may be configured for analyzing the at least one topic. Further, the processing device 204 may be configured for generating the at least one filter based on the analyzing of the at least one topic. Further, the analyzing of the plurality of documents may be based on the generating of the at least one filter.

Further, in some embodiments, the at least one judgment data may include at least one topic data associated with the at least one topic of at least one domain. Further, the processing device 204 may be configured for analyzing the at least one topic data. Further, the processing device 204 may be configured for determining at least one semantic meaning of the at least one topic. Further, the modifying of the at least one filter may be based on the determining of the at least one semantic meaning.

Further, in some embodiments, the communication device 202 may be configured for transmitting a binary question for a document of the plurality of documents to the at least one user device. Further, the binary question may include two response options. Further, the at least one judgment data may include a response indication for a response option of the two response options.

Figure 3:
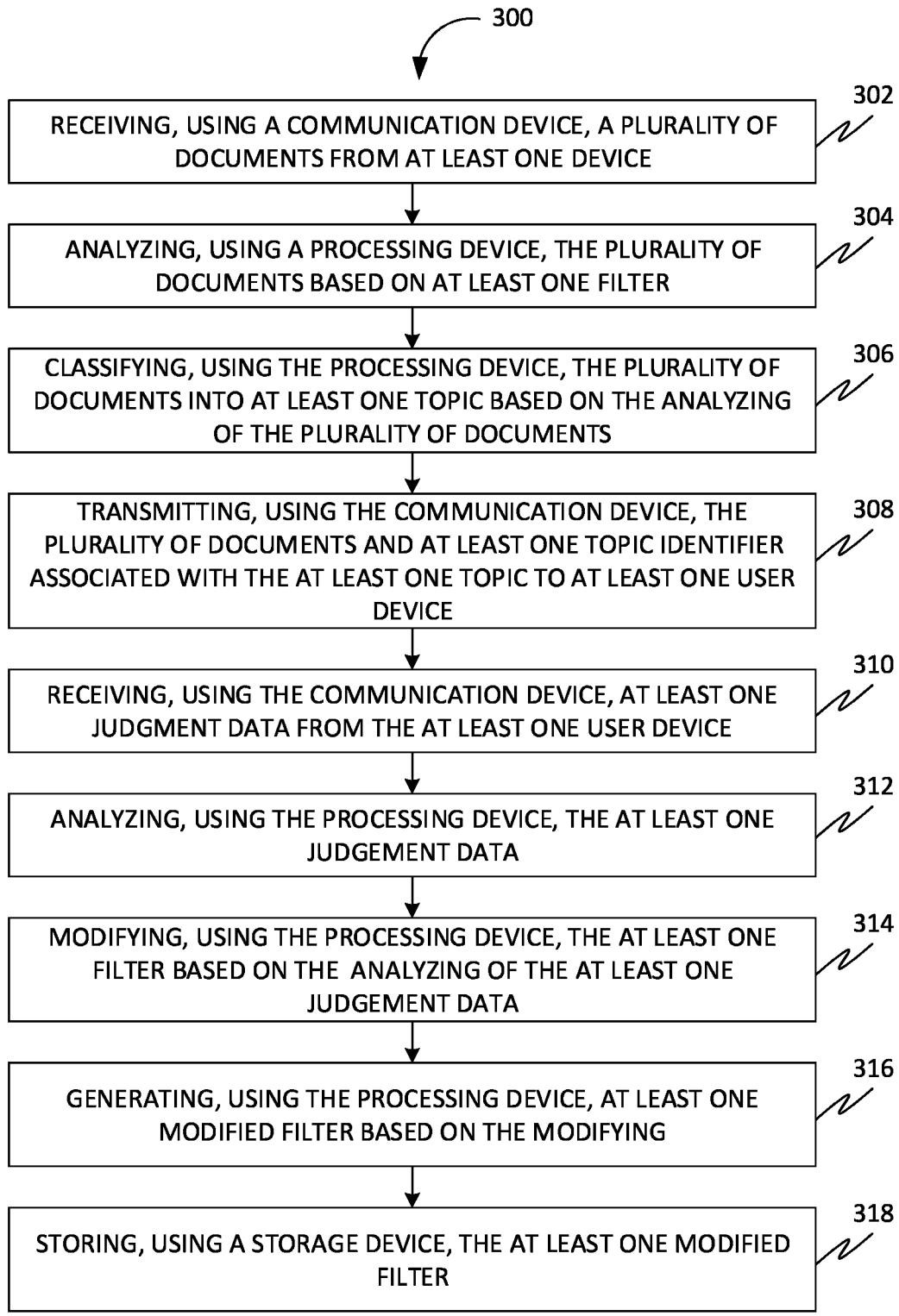
FIG. 3 is a flowchart of a method for facilitating the classification of the documents, in accordance with some embodiments.

FIG. 3 is a flowchart of a method 300 for facilitating the classification of the documents, in accordance with some embodiments. Accordingly, at 302, the method 300 may include a step of receiving, using a communication device, a plurality of documents from at least one user device. Further, the plurality of documents may include a plurality of regulatory documents.

Further, at 304, the method 300 may include a step of analyzing, using a processing device, the plurality of documents based on at least one filter.

Further, at 306, the method 300 may include a step of classifying, using the processing device, the plurality of documents into at least one topic based on the analyzing of the plurality of documents. Further, the at least one topic may be at least one category of the plurality of documents.

Further, at 308, the method 300 may include a step of transmitting, using the communication device, the plurality of documents and at least one topic identifier associated with the at least one topic to the at least one user device.

Further, at 310, the method 300 may include a step of receiving, using the communication device, at least one judgment data from the at least one user device. Further, the at least one judgment data may include a judgment on at least one relationship of the plurality of documents with the at least one topic.

Further, at 312, the method 300 may include a step of analyzing, using the processing device, the at least one judgment data.

Further, at 314, the method 300 may include a step of modifying, using the processing device, the at least one filter based on the analyzing of the at least one judgment data.

Further, at 316, the method 300 may include a step of generating, using the processing device, at least one modified filter based on the modifying. Further, the at least one modified filter may be used for classifying the plurality of documents into the at least one topic.

Further, at 318, the method 300 may include a step of storing, using a storage device, the at least one modified filter.

Further, in some embodiments, the at least one filter may include at least one machine learning algorithm. Further, the analyzing of the plurality of documents may be based on the at least one machine learning algorithm.

Further, in some embodiments, the modifying of the at least one filter may include improving the at least one machine learning algorithm. Further, the generating of the at least one modified filter may include generating at least one improved machine learning algorithm based on the improving. Further, the at least one improved machine learning algorithm may be used for classifying the plurality of documents into the at least one topic.

In further embodiments, the method 300 may include a step of transmitting, using the communication device, a binary question for a document of the plurality of documents to the at least one user device. Further, the binary question may include two response options. Further, the at least one judgment data may include a response indication for a response option of the two response options.

Figure 4:
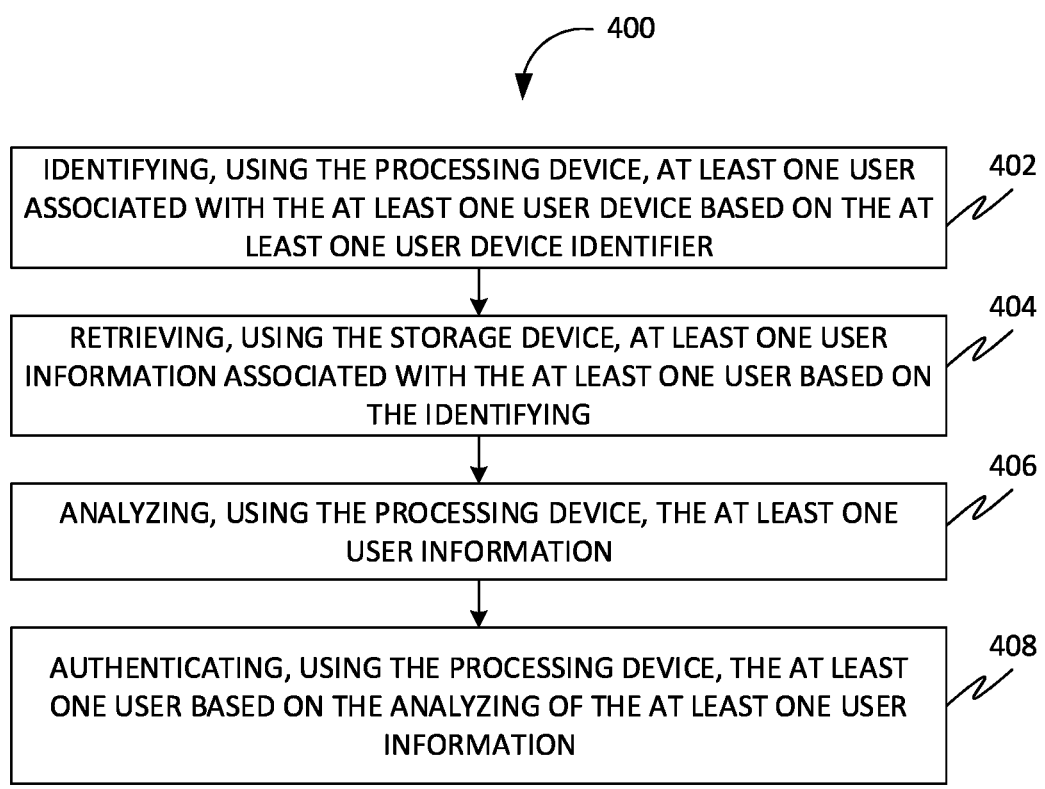
FIG. 4 is a flowchart of a method for authenticating at least one user for facilitating the classification of the documents, in accordance with some embodiments.

FIG. 4 is a flowchart of a method 400 for authenticating at least one user for facilitating the classification of the documents, in accordance with some embodiments. Accordingly, the at least one judgment data may include at least one user device identifier associated with the at least one user device. Further, at 402, the method 400 may include a step of identifying, using the processing device, at least one user associated with the at least one user device based on the at least one user device identifier.

Further, at 404, the method 400 may include a step of retrieving, using the storage device, at least one user information associated with the at least one user based on the identifying.

Further, at 406, the method 400 may include a step of analyzing, using the processing device, the at least one user information.

Further, at 408, the method 400 may include a step of authenticating, using the processing device, the at least one user based on the analyzing of the at least one user information. Further, the analyzing of the at least one judgment data may be based on the authenticating.

Figure 5:
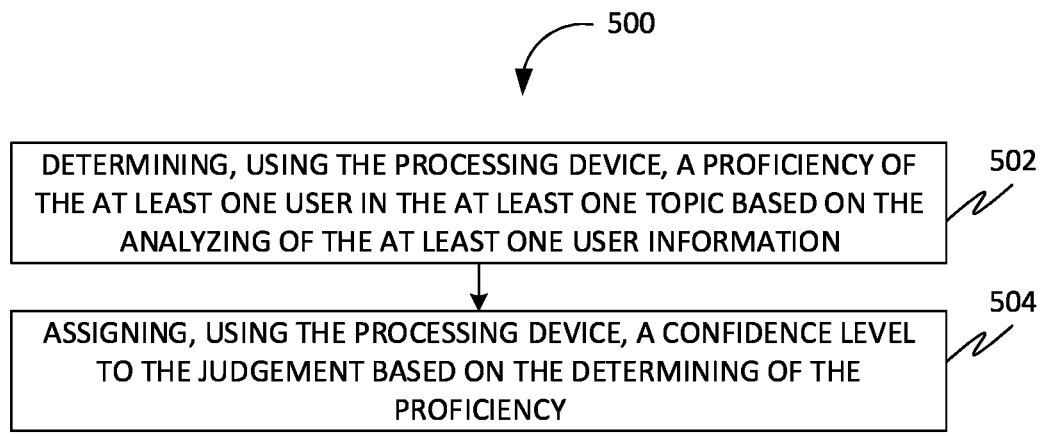
FIG. 5 is a flowchart of a method for assigning a confidence level for facilitating the classification of the documents, in accordance with some embodiments.

FIG. 5 is a flowchart of a method 500 for assigning a confidence level for facilitating the classification of the documents, in accordance with some embodiments. Accordingly, at 502, the method 500 may include a step of determining, using the processing device, a proficiency of the at least one user in the at least one topic based on the analyzing of the at least one user information.

Further, at 504, the method 500 may include a step of assigning, using the processing device, the confidence level to the judgment based on the determining of the proficiency. Further, the analyzing of the at least one judgment data may include comparing the confidence level with a predetermined confidence level. Further, the modifying of the at least one filter may be based on the comparing.

Figure 6:
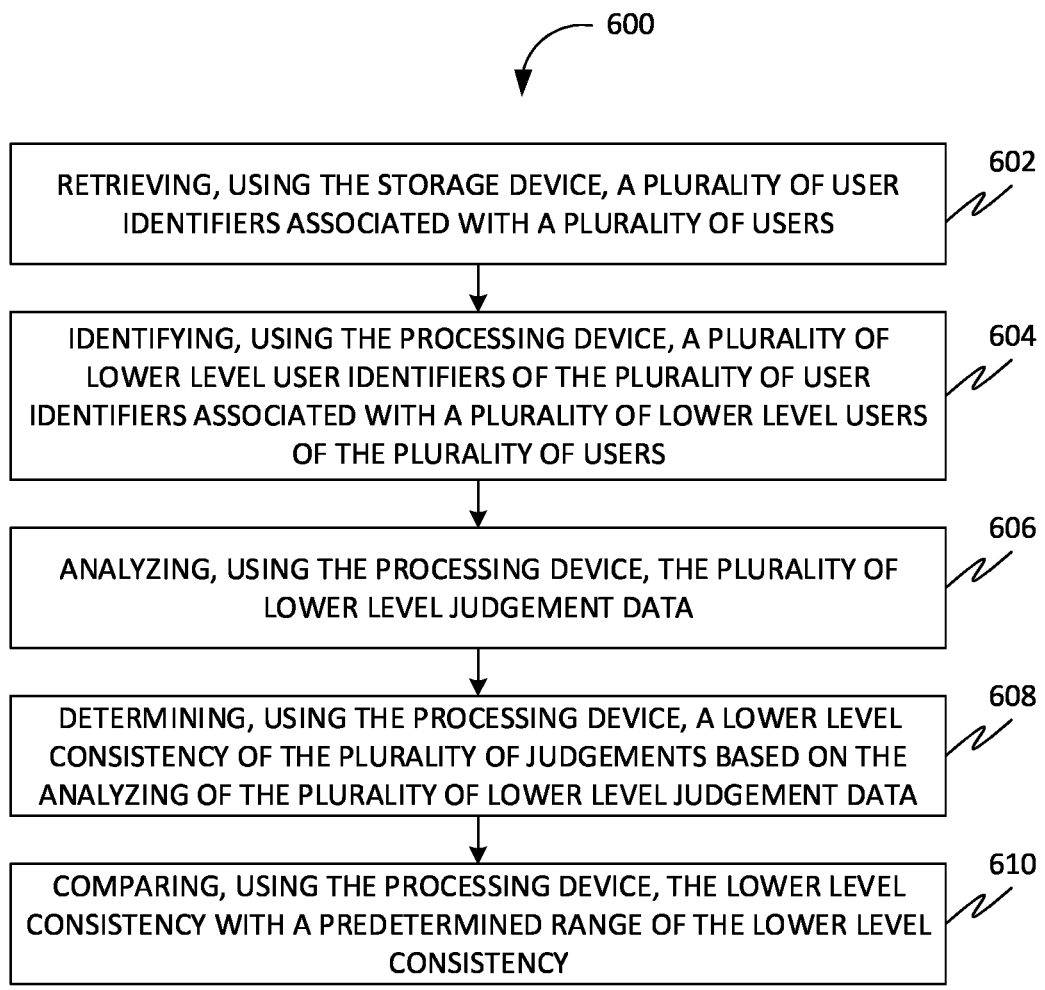
FIG. 6 is a flowchart of a method for modifying the at least one filter for facilitating the classification of the documents, in accordance with some embodiments.

FIG. 6 is a flowchart of a method 600 for modifying the at least one filter for facilitating the classification of the documents, in accordance with some embodiments. Accordingly, at 602, the method 600 may include a step of retrieving, using the storage device, a plurality of user identifiers associated with a plurality of users. Further, the plurality of users may be associated with a plurality of hierarchical levels of a proficiency in the at least one topic.

Further, at 604, the method 600 may include a step of identifying, using the processing device, a plurality of lower level user identifiers of the plurality of user identifiers associated with a plurality of lower level users of the plurality of users. Further, the plurality of lower level users may be associated with a lower hierarchical level of the plurality of hierarchical levels. Further, the at least one user device may include a plurality of lower level user devices. Further, the transmitting of the plurality of documents and the at least one topic identifier to the plurality of lower level user devices may be based on the identifying of the plurality of lower level user identifiers. Further, the at least one judgment data may include a plurality of lower level judgment data. Further, the receiving of the plurality of lower level judgment data from the plurality of lower level user devices may be based on the transmitting of the plurality of documents and the at least one topic identifier to the plurality of lower level user devices.

Further, at 606, the method 600 may include a step of analyzing, using the processing device, the plurality of lower level judgment data. Further, the plurality of lower level judgment data may include a plurality of judgments on the at least one relationship of the at least one document with the at least one topic.

Further, at 608, the method 600 may include a step of determining, using the processing device, a lower level consistency of the plurality of judgments based on the analyzing of the plurality of lower level judgment data.

Further, at 610, the method 600 may include a step of comparing, using the processing device, the lower level consistency with a predetermined range of the lower level consistency. Further, the modifying of the at least one filter may be based on the comparing of the lower level consistency.

Figure 7:
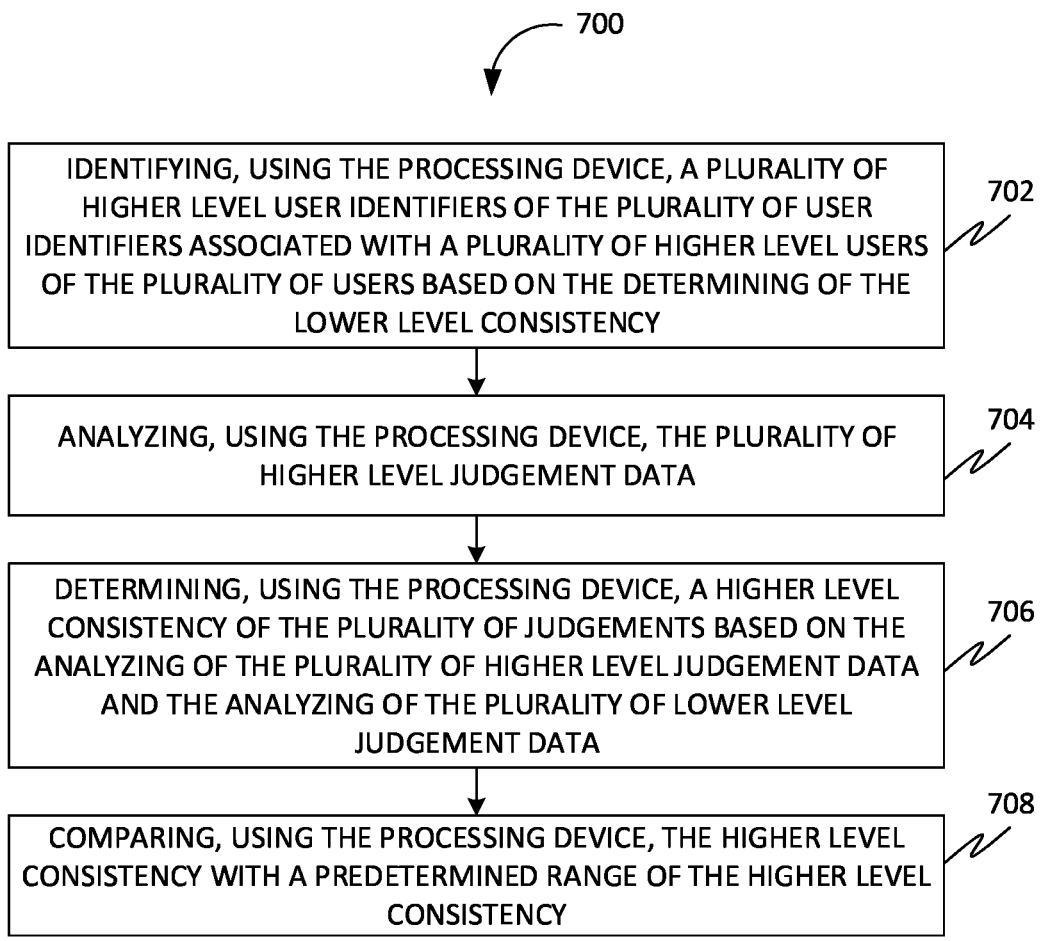
FIG. 7 is a flowchart of a method for authenticating at least one user for facilitating the classification of the documents, in accordance with some embodiments.

FIG. 7 is a flowchart of a method 700 for authenticating at least one user for facilitating the classification of the documents, in accordance with some embodiments. Accordingly, at 702, the method 700 may include a step of identifying, using the processing device, a plurality of higher level user identifiers of the plurality of user identifiers associated with a plurality of higher level users of the plurality of users based on the determining of the lower level consistency. Further, a number of the plurality of higher level users may be lower than a number of the plurality of lower level users. Further, the plurality of higher level users may be associated with a higher hierarchical level of the plurality of hierarchical levels. Further, the at least one user device may include a plurality of higher level user devices. Further, the transmitting of the plurality of documents and the at least one topic identifier to the plurality of higher level user devices may be based on the identifying of the plurality of higher level user identifiers. Further, the at least one judgment data may include a plurality of higher level judgment data. Further, the receiving of the plurality of higher level judgment data from the plurality of higher level user devices may be based on the transmitting of the plurality of documents and the at least one topic identifier to the plurality of higher level user devices.

Further, at 704, the method 700 may include a step of analyzing, using the processing device, the plurality of higher level judgment data. Further, the plurality of higher level judgment data may include a plurality of judgments on the at least one relationship of the at least one document with the at least one topic.

Further, at 706, the method 700 may include a step of determining, using the processing device, a higher level consistency of the plurality of judgments based on the analyzing of the plurality of higher level judgment data and the analyzing of the plurality of lower level judgment data.

Further, at 708, the method 700 may include a step of comparing, using the processing device, the higher level consistency with a predetermined range of the higher level consistency. Further, the modifying of the at least one filter may be further based on the comparing of the higher level consistency.

Figure 8:
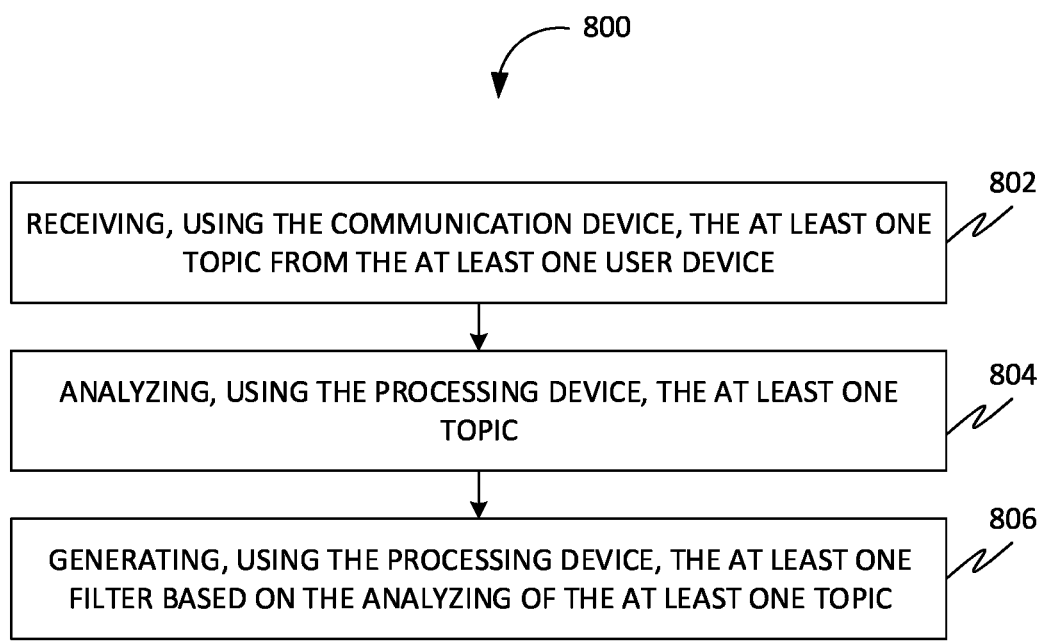
FIG. 8 is a flowchart of a method for generating the at least one filter for facilitating the classification of the documents, in accordance with some embodiments.

FIG. 8 is a flowchart of a method 800 for generating the at least one filter for facilitating the classification of the documents, in accordance with some embodiments. Accordingly, at 802, the method 800 may include a step of receiving, using the communication device, the at least one topic from the at least one user device. Further, the at least one topic may be associated with at least one domain.

Further, at 804, the method 800 may include a step of analyzing, using the processing device, the at least one topic.

Further, at 806, the method 800 may include a step of generating, using the processing device, the at least one filter based on the analyzing of the at least one topic. Further, the analyzing of the plurality of documents may be based on the generating of the at least one filter.

Figure 9:
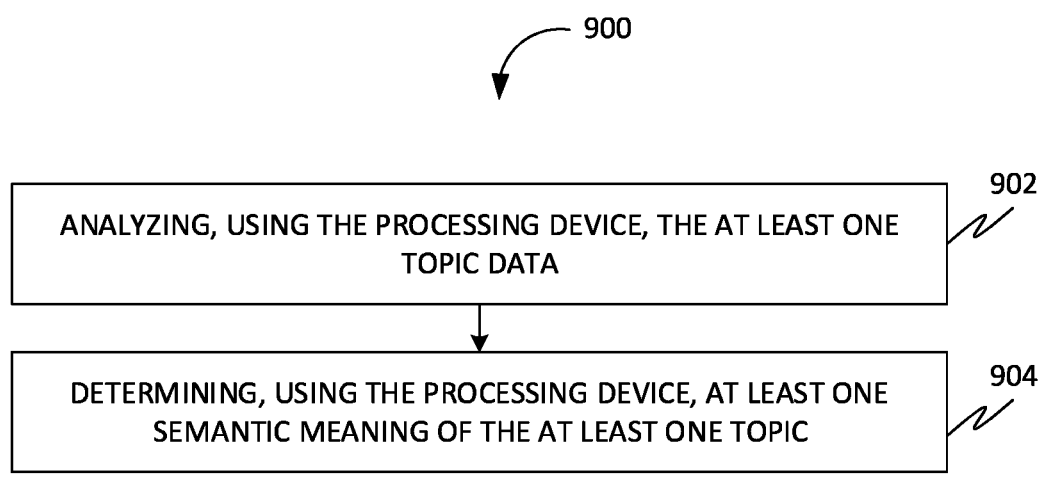
FIG. 9 is a flowchart of a method for determining at least one semantic meaning of the at least one topic for facilitating classification of the documents, in accordance with some embodiments.

FIG. 9 is a flowchart of a method 900 for determining at least one semantic meaning of the at least one topic for facilitating the classification of the documents, in accordance with some embodiments. Accordingly, the at least one judgment data may include at least one topic data associated with the at least one topic of at least one domain. Further, at 902, the method 900 may include a step of analyzing, using the processing device, the at least one topic data.

Further, at 904, the method 900 may include a step of determining, using the processing device, at least one semantic meaning of the at least one topic. Further, the modifying of the at least one filter may be based on the determining of the at least one semantic meaning.

Figure 10:
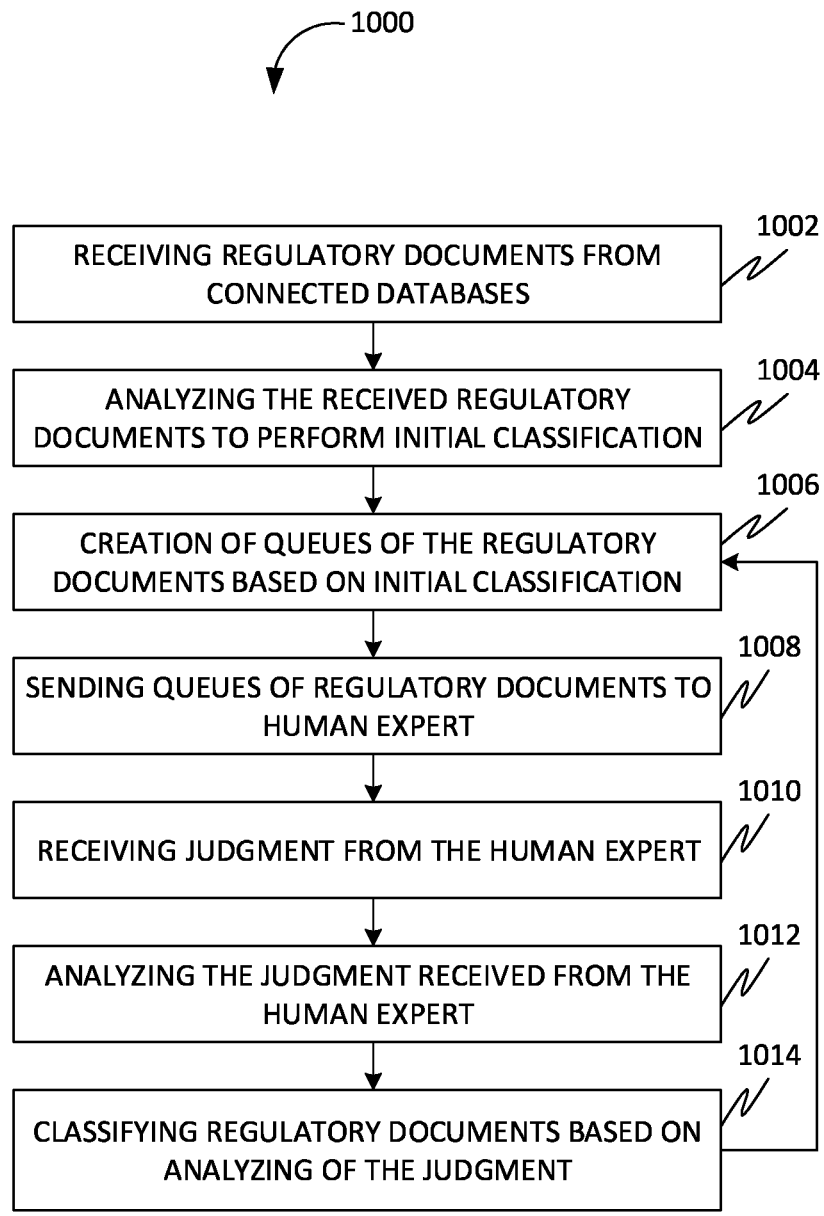
FIG. 10 is a flowchart of a method to facilitate surfacing and automatic classification of regulatory documents, in accordance with some embodiments.

FIG. 10 is a flowchart of a method 1000 to facilitate surfacing and automatic classification of regulatory documents, in accordance with some embodiments. Accordingly, the method 1000 may include a step of topic classification of the regulatory documents. Further, at 1002, the method 1000 may include a step of receiving regulatory documents from connected databases. The connected databases may include databases that may store regulatory documents, such as legal databases, medical databases, engineering databases, and so on. The regulatory documents may include supporting data such as the title, name, source, and so on.

Further, at 1004, the method 1000 may include analyzing the received regulatory documents to perform initial classification. The regulatory documents may be analyzed by analyzing the supporting data, such as the title, name, and the source of the document. Further, the document may be analyzed based on the phrases and the words that may be included in the document. For instance, if the document has multiple mentions of lending, the document may be classified and added to the list of regulatory documents that may describe lending. Further, the document may be classified into a subcategory of consumer lending based on the analysis.

Further, at 1006, the method 1000 may include a step of the creation of queues of regulatory documents based on the initial classification. A queue of regulatory documents may essentially be a list of regulatory documents that may belong to a single topic or category. The number of regulatory documents in a queue may vary. For instance, a queue may contain at least two regulatory documents. Further, there may not be a maximum limit on the number of regulatory documents that may be in a queue.

Further, at 1008, the method 1000 may include a step of sending queues to a human expert to receive judgment for machine learning. The human expert may be a user, who may be proficient or an expert in the particular field or topic that the regulatory documents in the queue may pertain to or include. For instance, a student who may be studying economics may be sent queues that may include regulatory documents that may pertain to lending, and a user who may be working as a professional in the banking sector may be sent queues containing regulatory documents that may pertain to mortgages.

Further, at 1010, the method 1000 may include a step of receiving judgment from the human expert. The judgment may be received from the expert through a user interface. The judgment received may be in different formats. The judgment may be a binary judgment, based on a yes or no condition. The human expert may view a regulatory document. Further, the expert may proceed to read and analyze the regulatory document manually. Upon reading and manually analyzing the regulatory document, the human expert may be presented a binary question with a simple yes or no response. For instance, the human expert may be asked if a particular regulatory document may relate to or pertain to a particular topic or category. Accordingly, the human expert may proceed to respond with yes, or no depending on the manual analysis that the human expert may have performed and indicate whether the document may belong to the particular topic or category based on the manual analysis of the document. Further, the human expert may provide an expanded judgment. The human expert may need to perform a detailed manual analysis of the regulatory document. Further, the human expert may choose a particular line or words that may help in the identification of the topic or category of the regulatory document. For instance, in the financial services domain, some agencies may enforce legal statutes, laws, or regulations by issuing an enforcement action. Enforcement may be a document that may contain an action detailing the incident detailing the breach of a statute or regulation, the name of a respondent, who may be addressed in the enforcement action, a penalty detailing the fine, or any other punishment that may be issued to the respondent, and the violation stating the exact legal citation violated by the respondent. A human expert may analyze the enforcement and may select the lines and words that may describe the action, and violation detailing the citation of a statute, law, or regulation.

Further, at 1012, the method 1000 may include a step of analyzing the judgment received from the human expert. The judgment received may be analyzed to determine the correctness of the initial classification based on topic and category. The binary judgment, along with the supporting input may be analyzed to determine and confirm the exact topic and category hat the regulatory document may pertain may be analyzed. Further, the expanded judgment may be analyzed to improve machine-learning algorithms that may make use of the judgments to analyze the regulatory document further in the queues. The judgment of the human expert may be analyzed and may be applied to classify the regulatory documents and improve the method 1000 and procedure of classification of regulatory documents.

Further, at 1014, the method 1000 may include a step of classifying the regulatory documents based on the analyzing of the judgment. The exact topic and category of a regulatory document may be determined and assigned based on the analysis of the binary judgment that the human expert may have provided. For instance, natural language processing may be performed and improved based on semantic analysis. Accordingly, words and terms used in regulatory documents may be analyzed based on the exact context to classify the regulatory documents. Further, the method 1000 includes feeding back classification and analysis into the initial queue creation.

Figure 11:
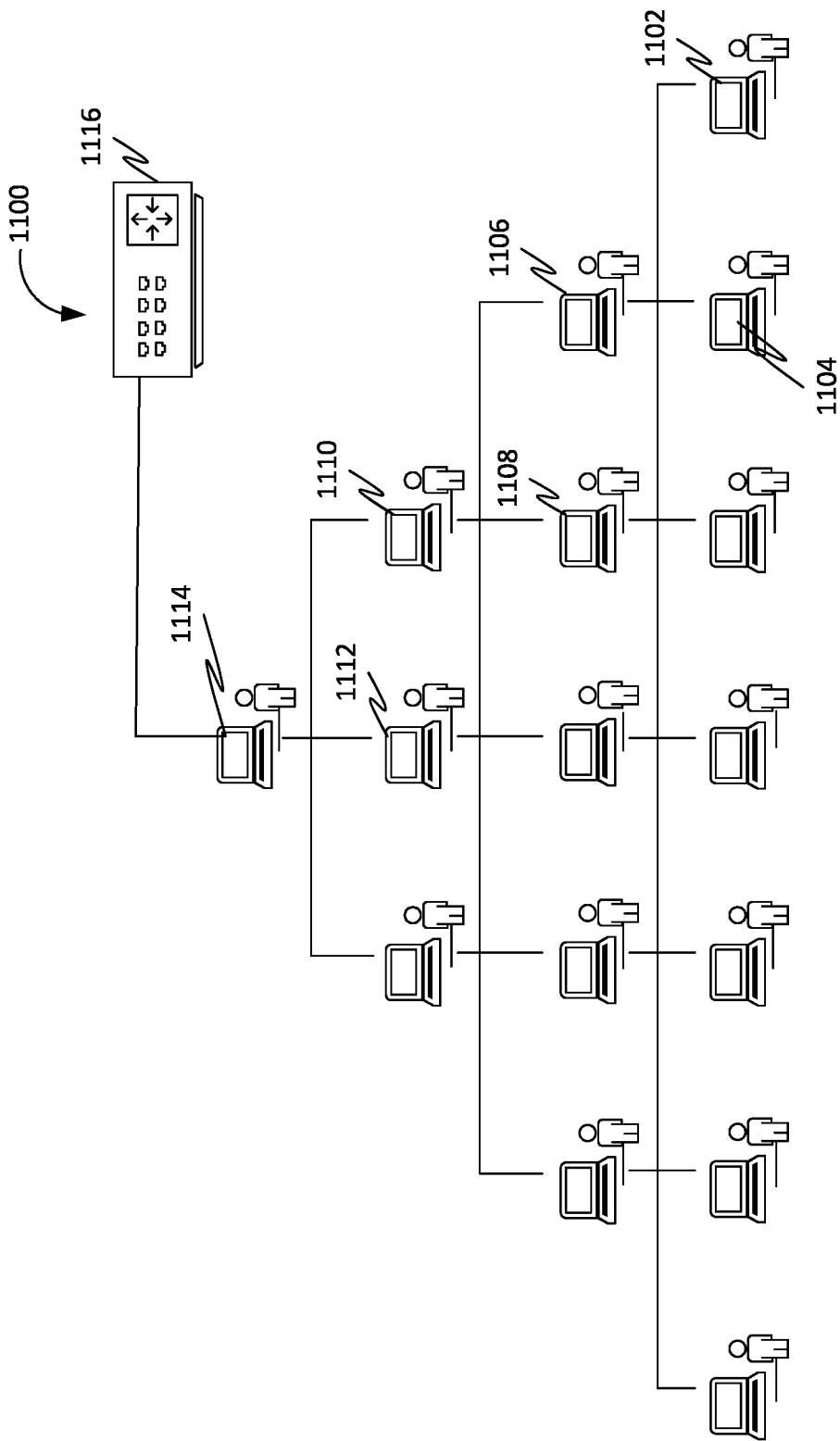
FIG. 11 is a schematic of a system to facilitate automatic classification of regulatory documents, in accordance with some embodiments.

FIG. 11 is a schematic of a system 1100 to facilitate automatic classification of regulatory documents, in accordance with some embodiments. Accordingly, the system 1100 may include a plurality of user devices 1102-1114 communicatively coupled to a server 1116. Further, the plurality of user devices 1102-1114 may be associated with a plurality of users that may be experts to provide judgments on the classification of the regulatory documents. Accordingly, the system 1100 may facilitate performing of automatic classification of regulatory documents with the help of unsupervised machine learning. Further, the plurality of users may be associated with a plurality of hierarchy levels. Further, a number of users in a lower hierarchy level of the plurality of hierarchy levels may be greater than a number of users in a higher hierarchy level of the plurality of hierarchy levels. Further, a user associated with a user device 1114 may be associated with the higher hierarchy level. Further, a user associated with a user device 1102 may be associated with the lower hierarchy level. Further, the regulatory documents may be analyzed and classified based on topics and categories automatically.

Figure 12:
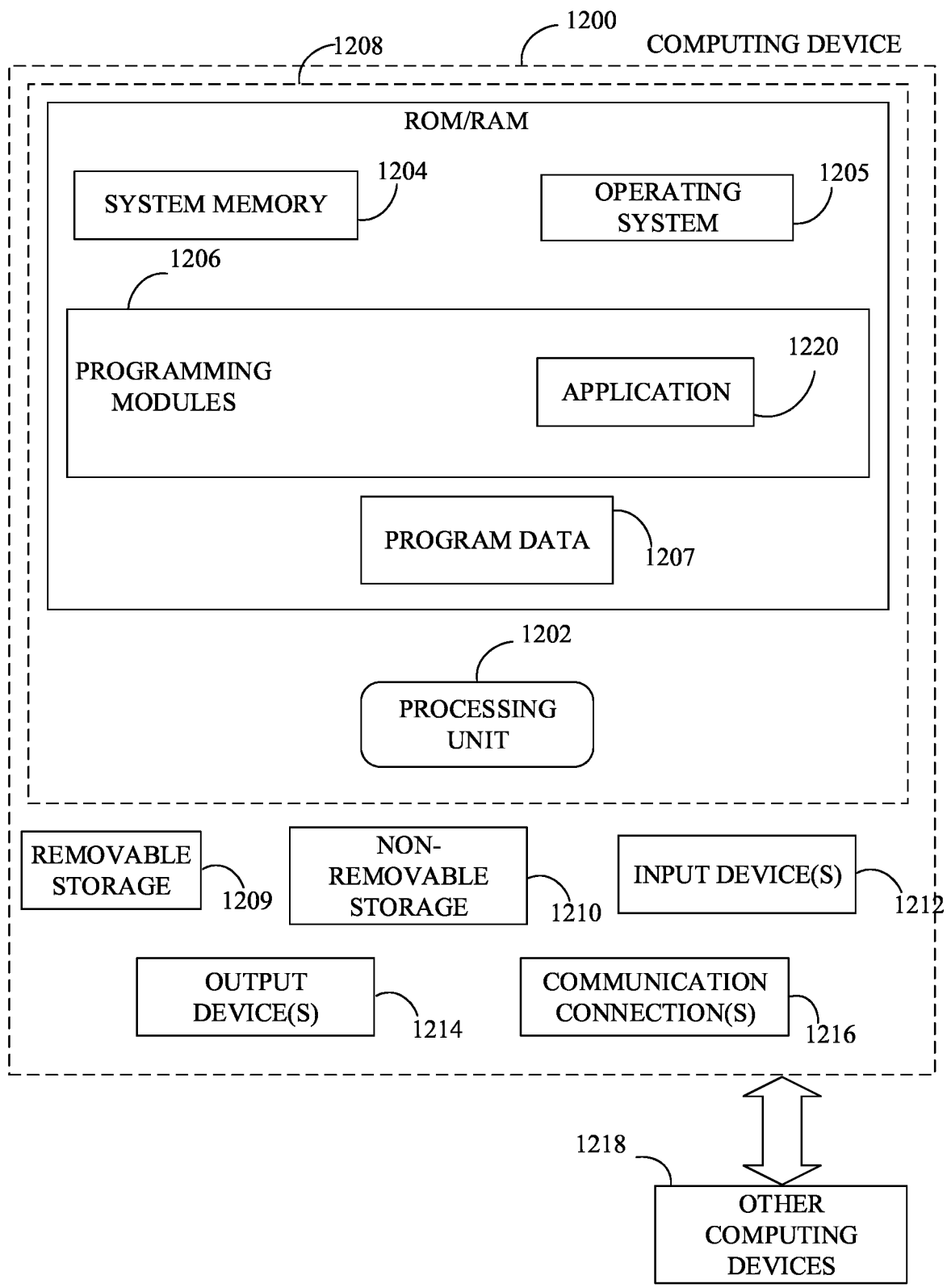
FIG. 12 is a block diagram of a computing device for implementing the methods disclosed herein, in accordance with some embodiments.

With reference to FIG. 12, a system consistent with an embodiment of the disclosure may include a computing device or cloud service, such as computing device 1200. In a basic configuration, computing device 1200 may include at least one processing unit 1202 and a system memory 1204. Depending on the configuration and type of computing device, system memory 1204 may comprise, but is not limited to, volatile (e.g. random-access memory (RAM)), non-volatile (e.g. read-only memory (ROM)), flash memory, or any combination. System memory 1204 may include operating system 1205, one or more programming modules 1206, and may include a program data 1207. Operating system 1205, for example, may be suitable for controlling computing device 1200's operation. In one embodiment, programming modules 1206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 12 by those components within a dashed line 1208.

Computing device 1200 may have additional features or functionality. For example, computing device 1200 may also include additional data storage devices (removable and/or non-removable) such as, for example, magnetic disks, optical disks, or tape. Such additional storage is illustrated in FIG. 12 by a removable storage 1209 and a non-removable storage 1210. Computer storage media may include volatile and non-volatile, removable and non-removable media implemented in any method or technology for storage of information, such as computer-readable instructions, data structures, program modules, or other data. System memory 1204, removable storage 1209, and non-removable storage 1210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1200. Any such computer storage media may be part of device 1200. Computing device 1200 may also have input device(s) 1212 such as a keyboard, a mouse, a pen, a sound input device, a touch input device, a location sensor, a camera, a biometric sensor, etc. Output device(s) 1214 such as a display, speakers, a printer, etc. may also be included. The aforementioned devices are examples and others may be used.

Computing device 1200 may also contain a communication connection 1216 that may allow device 1200 to communicate with other computing devices 1218, such as over a network in a distributed computing environment, for example, an intranet or the Internet. Communication connection 1216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1204, including operating system 1205. While executing on processing unit 1202, programming modules 1206 (e.g., application 1220) may perform processes including, for example, one or more stages of methods, algorithms, systems, applications, servers, databases as described above. The aforementioned process is an example, and processing unit 1202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A method for facilitating classification of documents, the method comprising:
    receiving, using a communication device, a plurality of documents from at least one user device;
    analyzing, using a processing device, the plurality of documents based on at least one filter;
    classifying, using the processing device, the plurality of documents into at least one topic based on the analyzing of the plurality of documents;
    transmitting, using the communication device, the plurality of documents and at least one topic identifier associated with the at least one topic to the at least one user device;
    receiving, using the communication device, at least one judgment data from the at least one user device, wherein the at least one judgment data comprises a judgment on at least one relationship of the plurality of documents with the at least one topic, wherein the judgment comprises a binary judgment and an expanded judgment, wherein the expanded judgment comprises words from the plurality of documents relating to classifying the plurality of documents;
    analyzing, using the processing device, the at least one judgment data;
    modifying, using the processing device, the at least one filter based on the analyzing of the at least one judgment data;
    generating, using the processing device, at least one modified filter based on the modifying, wherein the at least one modified filter is used for classifying the plurality of documents into the at least one topic;
    storing, using a storage device, the at least one modified filter;
    retrieving, using the storage device, a plurality of user identifiers associated with a plurality of users, wherein the plurality of users is associated with a plurality of hierarchical levels of a proficiency in the at least one topic;
    identifying, using the processing device, a plurality of lower level user identifiers of the plurality of user identifiers associated with a plurality of lower level users of the plurality of users, wherein the plurality of lower level users is associated with a lower hierarchical level of the plurality of hierarchical levels, wherein the at least one user device comprises a plurality of lower level user devices, wherein the transmitting of the plurality of documents and the at least one topic identifier to the plurality of lower level user devices is based on the identifying of the plurality of lower level user identifiers, wherein the at least one judgment data comprises a plurality of lower level judgment data, wherein the receiving of the plurality of lower level judgment data from the plurality of lower level user devices is based on the transmitting of the plurality of documents and the at least one topic identifier to the plurality of lower level user devices;

analyzing, using the processing device, the plurality of lower level judgment data, wherein the plurality of lower level judgment data comprises a plurality of judgments on the at least one relationship of the at least one document with the at least one topic;

determining, using the processing device, a lower level consistency of the plurality of judgments based on the analyzing of the plurality of lower level judgment data;

comparing, using the processing device, the lower level consistency with a predetermined range of the lower level consistency, wherein the modifying of the at least one filter is further based on the comparing of the lower level consistency and the analyzing of the plurality of lower level judgment data;

analyzing, using the processing device, if the lower level consistency is outside the predetermined range of the lower level consistency, a plurality of higher level judgment data, wherein the plurality of higher level judgment data comprises a plurality of judgments on the at least one relationship of the at least one document with the at least one topic;

determining, using the processing device, a higher level consistency of the plurality of judgments based on the analyzing of the plurality of higher level judgment data and the analyzing of the plurality of lower level judgment data; and comparing, using the processing device, the higher level consistency with a predetermined range of the higher level consistency, wherein the modifying of the at least one filter is further based on the comparing of the higher level consistency.

2. The method of claim 1, wherein the at least one judgment data comprises at least one user device identifier associated with the at least one user device, wherein the method further comprises:
identifying, using the processing device, at least one user associated with the at least one user device based on the at least one user device identifier;
retrieving, using the storage device, at least one user information associated with the at least one user based on the identifying;
analyzing, using the processing device, the at least one user information; and
authenticating, using the processing device, the at least one user based on the analyzing of the at least one user information, wherein the analyzing of the at least one judgment data is based on the authenticating.

3. The method of claim 2 further comprising:
determining, using the processing device, a proficiency of the at least one user in the at least one topic based on the analyzing of the at least one user information; and
assigning, using the processing device, a confidence level to the judgment based on the determining of the proficiency, wherein the analyzing of the at least one judgment data comprises comparing the confidence level with a predetermined confidence level, wherein the modifying of the at least one filter is based on the comparing.

4. The method of claim 1 further comprising:
identifying, using the processing device, a plurality of higher level user identifiers of the plurality of user identifiers associated with a plurality of higher level users of the plurality of users based on the determining of the lower level consistency, wherein a number of the plurality of higher level users is lower than a number of the plurality of lower level users, wherein the plurality of higher level users is associated with a higher hierarchical level of the plurality of hierarchical levels, wherein the at least one user device comprises a plurality of higher level user devices, wherein the transmitting of the plurality of documents and the at least one topic identifier to the plurality of higher level user devices is based on the identifying of the plurality of higher level user identifiers, wherein the at least one judgment data comprises a plurality of higher level judgment data, wherein the receiving of the plurality of higher level judgment data from the plurality of higher level user devices is based on the transmitting of the plurality of documents and the at least one topic identifier to the plurality of higher level user devices.

5. The method of claim 1, wherein the at least one filter comprises at least one machine learning algorithm, wherein the analyzing of the plurality of documents is based on the at least one machine learning algorithm.

6. The method of claim 5, wherein the modifying of the at least one filter comprises altering the at least one machine learning algorithm, wherein the generating of the at least one modified filter comprises generating at least one machine learning algorithm based on the altering, wherein the at least one machine learning algorithm is used for classifying the plurality of documents into the at least one topic.

7. The method of claim 1 further comprising:
receiving, using the communication device, the at least one topic from the at least one user device, wherein the at least one topic is associated with at least one domain;
analyzing, using the processing device, the at least one topic; and
generating, using the processing device, the at least one filter based on the analyzing of the at least one topic, wherein the analyzing of the plurality of documents is based on the generating of the at least one filter.

8. The method of claim 1, wherein the at least one judgment data comprises at least one topic data associated with the at least one topic of at least one domain, wherein the method further comprises:
analyzing, using the processing device, the at least one topic data; and
determining, using the processing device, at least one semantic meaning of the at least one topic, wherein the modifying of the at least one filter is based on the determining of the at least one semantic meaning.

9. The method of claim 1 further comprising transmitting, using the communication device, a binary question for a document of the plurality of documents to the at least one user device, wherein the binary question comprises two response options, wherein the at least one judgment data comprises a response indication for a response option of the two response options.

10. A system for facilitating classification of documents, the system comprising:
a communication device configured for:
receiving a plurality of documents from at least one user device;
transmitting the plurality of documents and at least one topic identifier associated with at least one topic to the at least one user device; and
receiving at least one judgment data from the at least one user device, wherein the at least one judgment data comprises a judgment on at least one relationship of the plurality of documents with the at least one topic, wherein the judgment comprises a binary judgement and an expanded judgment, wherein the expanded judgment comprises words from the plurality of documents relating to classifying the plurality of documents;
a processing device communicatively coupled with the communication device, wherein the processing device is configured for:
analyzing the plurality of documents based on at least one filter;
classifying the plurality of documents into the at least one topic based on the analyzing of the plurality of documents;
analyzing the at least one judgment data;
modifying the at least one filter based on the analyzing of the at least one judgment data; and
generating at least one modified filter based on the modifying, wherein the at least one modified filter is used for classifying the plurality of documents into the at least one topic;
identifying a plurality of lower level user identifiers of the plurality of user identifiers associated with a plurality of lower level users of the plurality of users, wherein the plurality of lower level users is associated with a lower hierarchical level of the plurality of hierarchical levels, wherein the at least one user device comprises a plurality of lower level user devices, wherein the transmitting of the plurality of documents and the at least one topic identifier to the plurality of lower level user devices is based on the identifying of the plurality of lower level user identifiers, wherein the at least one judgment data comprises a plurality of lower level judgment data, wherein the receiving of the plurality of lower level judgment data from the plurality of lower level user devices is based on the transmitting of the plurality of documents and the at least one topic identifier to the plurality of lower level user devices;
analyzing the plurality of lower level judgment data, wherein the plurality of lower level judgment data comprises a plurality of judgments on the at least one relationship of the at least one document with the at least one topic;
determining a lower level consistency of the plurality of judgments based on the analyzing of the plurality of lower level judgment data;
comparing the lower level consistency with a predetermined range of the lower level consistency, wherein the modifying of the at least one filter is further based on the comparing of the lower level consistency and the analyzing of the plurality of lower level judgment data;
analyzing the plurality of higher level judgment data, wherein the plurality of higher level judgment data comprises a plurality of judgments on the at least one relationship of the at least one document with the at least one topic;
determining a higher level consistency of the plurality of judgments based on the analyzing of the plurality of higher level judgment data and the analyzing of the plurality of lower level judgment data; and
comparing the higher level consistency with a predetermined range of the higher level consistency, wherein the modifying of the at least one filter is further based on the comparing of the higher level consistency; and
a storage device communicatively coupled with the processing device, wherein the storage device is configured for:
storing the at least one modified filter; and
retrieving a plurality of user identifiers associated with a plurality of users, wherein the plurality of users is associated with a plurality of hierarchical levels of a proficiency in the at least one topic.

11. The system of claim 1, wherein the at least one judgment data comprises at least one user device identifier associated with the at least one user device, wherein the processing device is further configured for:
identifying at least one user associated with the at least one user device based on the at least one user device identifier;
analyzing at least one user information; and
authenticating the at least one user based on the analyzing of the at least one user information, wherein the storage device is further configured for retrieving at least one user information associated with the at least one user based on the identifying, wherein the analyzing of the at least one judgment data is based on the authenticating.

12. The system of claim 11, wherein the processing device is further configured for:
determining a proficiency of the at least one user in the at least one topic based on the analyzing of the at least one user information; and
assigning a confidence level to the judgment based on the determining of the proficiency, wherein the analyzing of the at least one judgment data comprises comparing the confidence level with a predetermined confidence level, wherein the modifying of the at least one filter is based on the comparing.

13. The system of claim 10, wherein the processing device is further configured for:
identifying a plurality of higher level user identifiers of the plurality of user identifiers associated with a plurality of higher level users of the plurality of users based on the determining of the lower level consistency, wherein a number of the plurality of higher level users is lower than a number of the plurality of lower level users, wherein the plurality of higher level users is associated with a higher hierarchical level of the plurality of hierarchical levels, wherein the at least one user device comprises a plurality of higher level user devices, wherein the transmitting of the plurality of documents and the at least one topic identifier to the plurality of higher level user devices is based on the identifying of the plurality of higher level user identifiers, wherein the at least one judgment data comprises a plurality of higher level judgment data, wherein the receiving of the plurality of higher level judgment data from the plurality of higher level user devices is based on the transmitting of the plurality of documents and the at least one topic identifier to the plurality of higher level user devices.

14. The system of claim 10, wherein the at least one filter comprises at least one machine learning algorithm, wherein the analyzing of the plurality of documents is based on the at least one machine learning algorithm.

15. The system of claim 14, wherein the modifying of the at least one filter comprises altering the at least one machine learning algorithm, wherein the generating of the at least one modified filter comprises generating at least one machine learning algorithm based on the altering, wherein the at least one machine learning algorithm is used for classifying the plurality of documents into the at least one topic.

16. The system of claim 10, wherein the communication device is further configured for receiving the at least one topic from the at least one user device, wherein the at least one topic is associated with at least one domain, wherein the processing device is further configured for:

analyzing the at least one topic; and generating the at least one filter based on the analyzing of the at least one topic, wherein the analyzing of the plurality of documents is based on the generating of the at least one filter.

17. The system of claim 10, wherein the at least one judgment data comprises at least one topic data associated with the at least one topic of at least one domain, wherein the processing device is further configured for:

analyzing the at least one topic data; and determining at least one semantic meaning of the at least one topic, wherein the modifying of the at least one filter is based on the determining of the at least one semantic meaning.

18. The system of claim 10, wherein the communication device is further configured for transmitting a binary question for a document of the plurality of documents to the at least one user device, wherein the binary question comprises two response options, wherein the at least one judgment data comprises a response indication for a response option of the two response options.

\* \* \* \* \*